United States Patent
Braeuer et al.

(10) Patent No.: US 10,900,401 B2
(45) Date of Patent: Jan. 26, 2021

(54) METHOD FOR DETECTING A BLOCKED PRESSURE LINE

(71) Applicant: Robert Bosch GmbH, Stuttgart (DE)

(72) Inventors: Alexander Braeuer, Stuttgart (DE); Florian Dencker, Tamm (DE)

(73) Assignee: Robert Bosch GmbH, Stuttgart (DE)

(*) Notice: Subject to any disclaimer, the term of this patent is extended or adjusted under 35 U.S.C. 154(b) by 156 days.

(21) Appl. No.: 16/326,241

(22) PCT Filed: Jul. 27, 2017

(86) PCT No.: PCT/EP2017/068980
§ 371 (c)(1),
(2) Date: Feb. 18, 2019

(87) PCT Pub. No.: WO2018/033358
PCT Pub. Date: Feb. 22, 2018

(65) Prior Publication Data
US 2020/0165951 A1    May 28, 2020

(30) Foreign Application Priority Data
Aug. 17, 2016 (DE) .......................... 10 2016 215 380

(51) Int. Cl.
*F01N 3/20* (2006.01)

(52) U.S. Cl.
CPC .......... *F01N 3/208* (2013.01); *F01N 2610/02* (2013.01); *F01N 2610/144* (2013.01);
(Continued)

(58) Field of Classification Search
CPC ............... F01N 3/208; F01N 2610/144; F01N 2610/148; F01N 2900/0416; F01N 2900/1808
(Continued)

(56) References Cited

U.S. PATENT DOCUMENTS

| 9,822,686 B2* | 11/2017 | Liljestrand | F01N 3/208 |
| 2005/0235632 A1* | 10/2005 | Tarabulski | F01N 3/208 |
| | | | 239/533.12 |

(Continued)

FOREIGN PATENT DOCUMENTS

| CN | 101617105 A | 12/2009 |
| CN | 101617106 A | 12/2009 |

(Continued)

OTHER PUBLICATIONS

International Search Report for Application No. PCT/EP2017/068980 dated Nov. 2, 2017 (English Translation, 2 pages).

*Primary Examiner* — Thai Ba Trieu
(74) *Attorney, Agent, or Firm* — Michael Best & Friedrich LLP

(57) ABSTRACT

A method of detecting a blocked pressure line in an internal combustion engine SCR system, which includes a feed pump, a dosing module, a pressure sensor, and an electronic control unit, includes a reference signal of a pressure (p) in the pressure line being measured over a measuring time ($t_M$) if a reducing agent solution is not dosed by the dosing module, and a signal energy of the reference signal is then calculated; a pressure signal being measured over the measuring time ($t_M$) during the dosing of a dosing mass of the reducing agent solution by the dosing module; and a signal energy of the pressure signal is then calculated; a ratio of the signal energies of the pressure signal to the signal energy of the reference signal being calculated; and finally the blocked pressure line being detected if the ratio falls short of a first pre-definable threshold value.

8 Claims, 3 Drawing Sheets

(52) U.S. Cl.
CPC .................. *F01N 2610/148* (2013.01); *F01N 2900/0416* (2013.01); *F01N 2900/1808* (2013.01)

(58) Field of Classification Search
USPC .......................................................... 60/274
See application file for complete search history.

(56) References Cited

U.S. PATENT DOCUMENTS

| | | | |
|---|---|---|---|
| 2007/0138322 A1* | 6/2007 | Tarabulski | F01N 3/208 239/533.12 |
| 2007/0163239 A1 | 7/2007 | Hofmann et al. | |
| 2008/0066453 A1* | 3/2008 | Oberski | F01N 3/2066 60/286 |
| 2008/0087739 A1* | 4/2008 | Tarabulski | F01N 3/208 239/11 |
| 2009/0104085 A1* | 4/2009 | Ichikawa | F01N 3/208 422/112 |
| 2009/0301068 A1* | 12/2009 | Fujita | F01N 3/208 60/286 |
| 2010/0172816 A1* | 7/2010 | Mayer | F01N 3/2066 423/352 |
| 2013/0055701 A1* | 3/2013 | Yan | F01N 3/208 60/287 |
| 2013/0340409 A1* | 12/2013 | Hodgson | F01N 3/208 60/274 |
| 2014/0053535 A1 | 2/2014 | Dyrbusch et al. | |
| 2014/0150409 A1* | 6/2014 | George | F01N 3/208 60/274 |
| 2017/0107877 A1* | 4/2017 | Johnson | F01N 3/2066 |
| 2018/0087427 A1* | 3/2018 | Korenaga | F01N 3/027 |
| 2018/0320570 A1* | 11/2018 | Car | F01N 3/021 |

FOREIGN PATENT DOCUMENTS

| | | |
|---|---|---|
| CN | 102735392 A | 10/2012 |
| CN | 102985652 A | 3/2013 |
| DE | 10346220 | 4/2005 |
| DE | 102011078870 | 7/2012 |
| DE | 102012200917 | 7/2013 |
| DE | 102012213525 | 2/2014 |
| DE | 102012215024 | 2/2014 |
| FR | 2872212 A1 | 12/2005 |
| JP | H07224636 A | 8/1995 |

\* cited by examiner

METHOD FOR DETECTING A BLOCKED PRESSURE LINE

BACKGROUND OF THE INVENTION

The present invention relates to a method for detecting a blocked pressure line in an SCR system. Furthermore, the present invention relates to a computer program which executes each step of the method when it runs on a computing unit, and a machine-readable storage medium, which stores the computer program. Finally, the invention relates to an electronic control unit which is configured to execute the method.

The SCR method (selective catalytic reduction) is currently used in the posttreatment of exhaust gases of an internal combustion engine in order to reduce nitrogen oxides (NOx) in the exhaust gas. DE 103 46 220 A1 describes the fundamental principle. In this case, a 32.5% urea-water solution (UWS), also known commercially as AdBlue®, is injected into the oxygen-rich exhaust gas. A metering module is provided for this purpose, which comprises a nozzle in order to inject the UWS into the exhaust gas stream. The UWS reacts in the SCR catalytic converter to form ammonia, which subsequently bonds to the nitrogen oxides, from which water and nitrogen result. The UWS is pumped via a conveyor module from a reducing agent tank to the metering module. In addition, the conveyor module is connected via a return line to the reducing agent tank, so that excess UWS can be returned.

A pressure sensor is typically used in the pressure line in order to monitor the system pressure and as a result, inter alia, to ascertain a metering duration of the metering module. Moreover, the pressure sensor is used to monitor the metering module at the beginning of injection (BIP—begin of injection period) and at the end thereof (EIP—end of injection period). Furthermore, a correction of the activation duration is computed from the BIP and EIP information to thus correct the deviations of the injection quantity during the opening and closing of the injector.

The above-mentioned 32.5% UWS freezes at approximately −11° C. Therefore, it has to be taken into consideration that the pressure line can be blocked as a result of frozen UWS and as a consequence no UWS is injected into the exhaust system. In conventional monitoring strategies, it is presumed that after the thawing of the pressure line, it no longer freezes closed and accordingly monitoring of the metering module at the beginning of the injection is sufficient.

For example, DE 10 2012 215 024 A1 describes a method for monitoring a pressure sensor in a conveyor and metering system for a reactant of an SCR catalytic converter. This system comprises a conveyor unit having a conveyor pump and a pressure line, which opens into a metering unit, via which the reactant is injected under pressure into an exhaust system. This is a pressure-regulated system, wherein the regulation and monitoring of the pressure are based on the signals of a pressure sensor, which detects the pressure in the pressure line. To monitor the pressure sensor, the method provides carrying out a flow velocity measurement by means of a flow velocity sensor in the pressure line. The pressure sensor can be monitored for different operating modes via the relationship between flow velocity and pressure, and the comparison to a reference measurement.

DE 10 2012 213 525 A1 describes a method for monitoring a conveyor and metering system. The conveyor and metering system itself is provided for conveying a liquid medium from a tank and for metering the medium via a pressure line and a first metering module. In particular, it can be established whether there is a partial or complete blocking of the valve or the valves in the metering module. For this purpose, a comparison is carried out between a metering quantity and/or a flow rate of the metering module and an internal reference. A second metering module and a return conveyor pump are mentioned as the reference. Furthermore, a pressure sensor is associated with the pressure line.

SUMMARY OF THE INVENTION

The method is used for detecting a blocked pressure line in an SCR system of an internal combustion engine. The pressure line is connected to a conveyor module, on the one hand, and to a metering module, on the other hand, and moreover has a pressure sensor. The method comprises two independent measurements of the pressure in the pressure line by the pressure sensor. The measurement of a reference signal of the pressure in the pressure line is carried out when injection of a reducing agent solution into an exhaust system by the metering module is not taking place. Moreover, a measurement of the pressure signal is performed during injection of a metered mass of the reducing agent solution into the exhaust system by the metering module. For a later comparison, the measurements are carried out over a measuring time of equal length. The sequence in which the measurements are carried out is irrelevant for the method and is preferably adapted with regard to the operation of the internal combustion engine and/or concurrent processes.

The signal energies of the two measured pressure signals are computed thereafter. The signal energy E denotes the energy of a time-continuous signal s and is computed according to the following formula 1:

$$E = \int_{-\infty}^{+\infty} s^2(t)dt \qquad \text{(Formula 1)}$$

The signal s is first squared and then integrated over the time t. If the signal s is not defined over the entire time t, the integral is then to be computed over all time intervals in which the signal s is defined. Considered physically, the signal energy E and accordingly also the integral are to be finite.

In the event that the pressure line is not blocked, a pressure drop occurs during the injection. To be able to maintain the pressure level for the injection, the pump speed rises in return. This results in a change of the dynamic response and accordingly in an excitation of the pressure signal. The signal energy of the pressure signal thus rises noticeably in comparison to the signal energy of the reference signal.

In contrast, if the pressure line is blocked, no injection or only a minor injection takes place. As a result, the pressure hardly changes and the signal energy of the pressure signal and that of the reference signal only differ insignificantly.

Finally, a ratio is computed via a quotient of the signal energy of the pressure signal and the signal energy of the reference signal, on the basis of which the detection of the blocked pressure line is performed. As described above, the signal energies of the pressure signal and the reference signal noticeably differ in the event of the unblocked pressure line, and therefore the ratio is significantly greater than 1. In contrast, these are nearly equal in the case of the blocked pressure line and the ratio is accordingly close to 1 or can even be less than 1. Therefore, the detection of the blocked pressure line occurs when the ratio of the signal energies falls below a first predefinable threshold value. This threshold value is preferably between 1 and 2 and particularly preferably between 1 and 1.5.

If only a small metered mass of the reducing agent solution is injected, this can cause a false detection of the blocked pressure line because of an excessively small pressure drop. The measurement of the pressure signal is therefore preferably only carried out when the metered mass has exceeded a predefinable limiting mass.

It is preferable for the conveyor pump to maintain a setpoint pressure in the pressure line during the measurement of the reference signal. Moreover, it is preferable for the conveyor pump to compensate for a pressure change as a result of the injection of the metered mass during the measurement of the pressure signal. Both the pressure signal and the reference signal are as a result measured at equal setpoint pressure and therefore the comparability of these signals is enhanced.

According to a further aspect, pump speeds of the conveyor pump can be taken into consideration in the detection of the blocked pressure line. It is advantageous if the pump speeds approximately correspond during the measurement of the reference signal and during the measurement of the pressure signal, since artifacts in the pressure signal and/or in the reference signal because of different pump speeds are avoided. For this purpose it is provided that the pump speed of the conveyor pump can be detected in each case during the measurement of the reference signal and during the measurement of the pressure signal. A detection of the blocked pressure line preferably only occurs if a ratio of the pump speeds of the conveyor pump is between a predefinable second threshold value and a predefinable third threshold value. Particularly preferably, the second threshold value can be between 1 and 2 and the third threshold value can be between 0.5 and 1.

A waiting time can optionally be provided between the beginning of the injection and the measuring of the pressure signal. It can thus be ensured, on the one hand, that the excitation of the pressure signal has already propagated in the pressure line, in particular up to the pressure sensor, and, on the other hand, a delayed increase of the pump speeds can be masked. Alternatively, the excitation of the pressure signal can also take place due to the metering valve, i.e., the set metering frequency can also be detected by a filter in the pressure signal. As in the case of the change of the pump speed, the metering frequency is also specific and can be specifically analyzed via a bandpass filter. In both variants, the pressure signal can be studied for an overlaid disturbance, which is specific to the system. The pump and the metering valve of a metering system can be detected unambiguously in the analysis of the frequency band in the pressure signal via bandpass filters.

The computer program is configured to carry out every step of the method, in particular when it is carried out on a computing unit or control unit. It enables the implementation of the method in a conventional electronic control unit, without having to perform structural modifications thereon. For this purpose, it is stored on the machine-readable storage medium.

By installing the computer program onto a conventional electronic control unit, the electronic control unit according to the invention is obtained, which is configured to carry out the detection of the blocked pressure line by means of the method.

BRIEF DESCRIPTION OF THE DRAWINGS

Exemplary embodiments of the invention are illustrated in the drawings and explained in greater detail in the following description.

DETAILED DESCRIPTION

Figure 1:
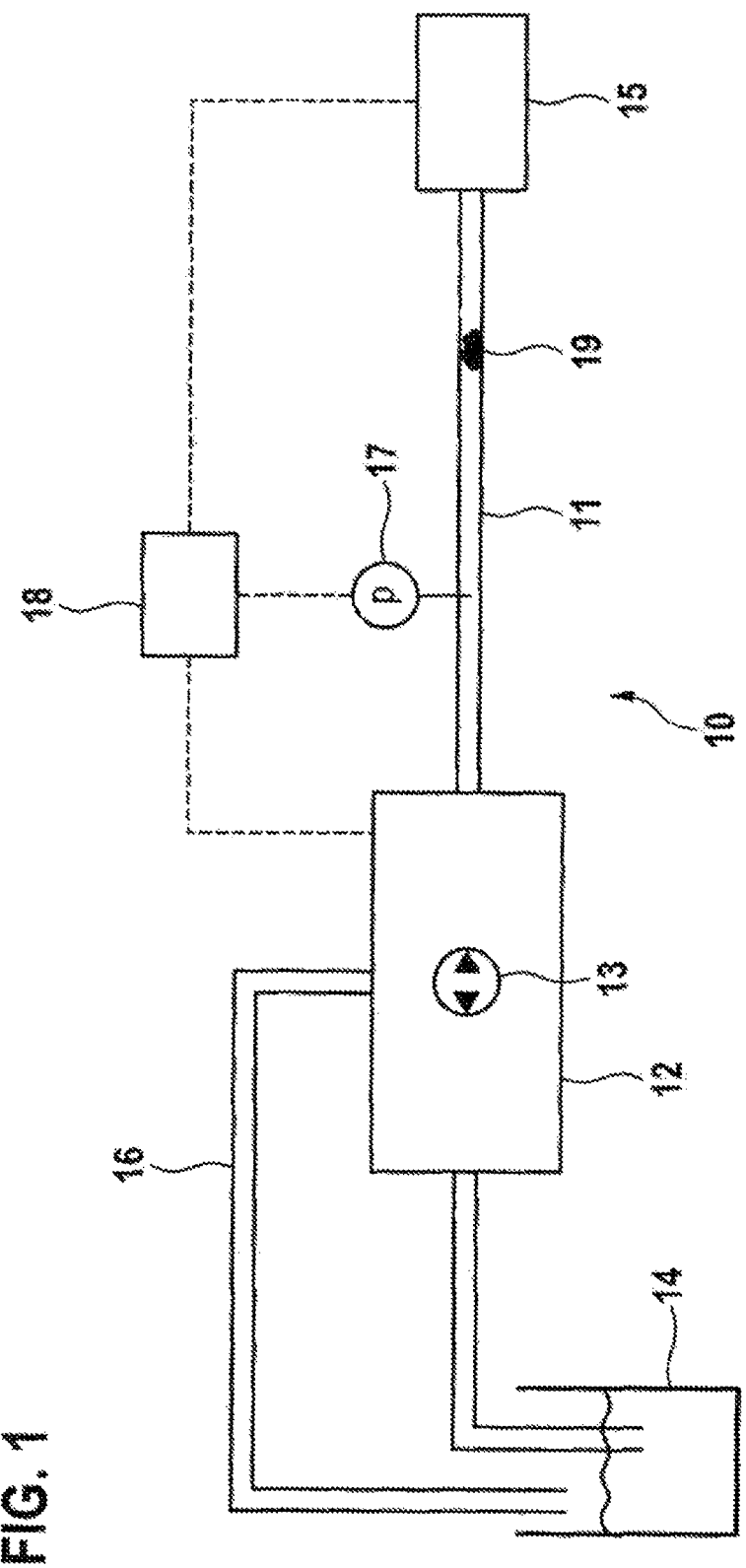
FIG. 1 schematically shows a reducing agent conveyor system of an SCR system, the pressure line of which can be detected by means of an exemplary embodiment of the method according to the invention.

FIG. 1 shows an SCR system 10 for conveying reducing agent through a pressure line 11 into an SCR catalytic converter (not shown). It comprises a conveyor module 12, which comprises a pump 13, which is configured to convey reducing agent from a reducing agent tank 14. The conveyor module 12 is connected via the pressure line 11 to a metering module 15, wherein reducing agent is conveyed by the conveyor module 12 through the pressure line 11 to the metering module 15, where it is subsequently injected into an exhaust system (not shown). In addition, the SCR system 10 comprises a return conveyor line 16, which connects the conveyor module 12 to the reducing agent tank 14. Excess reducing agent is conveyed back from the conveyor module 12 into the reducing agent tank 14. Furthermore, the pressure line 11 has a pressure sensor 17, which monitors the pressure p in the pressure line 11 and is connected to an electronic control unit 18. The electronic control unit 18 is additionally connected to the conveyor module 12 and the metering module 15 and can control them. In addition, a clog 19 inside the pressure line 11 is shown in FIG. 1, which blocks the reducing agent flow between conveyor module 12 and metering module 15 and can be detected by means of an embodiment of the method according to the invention. This clog 19 can arise because the reducing agent solution freezes at low ambient temperatures. However, other factors, for example soiling, can also result in the formation of such a clog 19.

Figure 2:
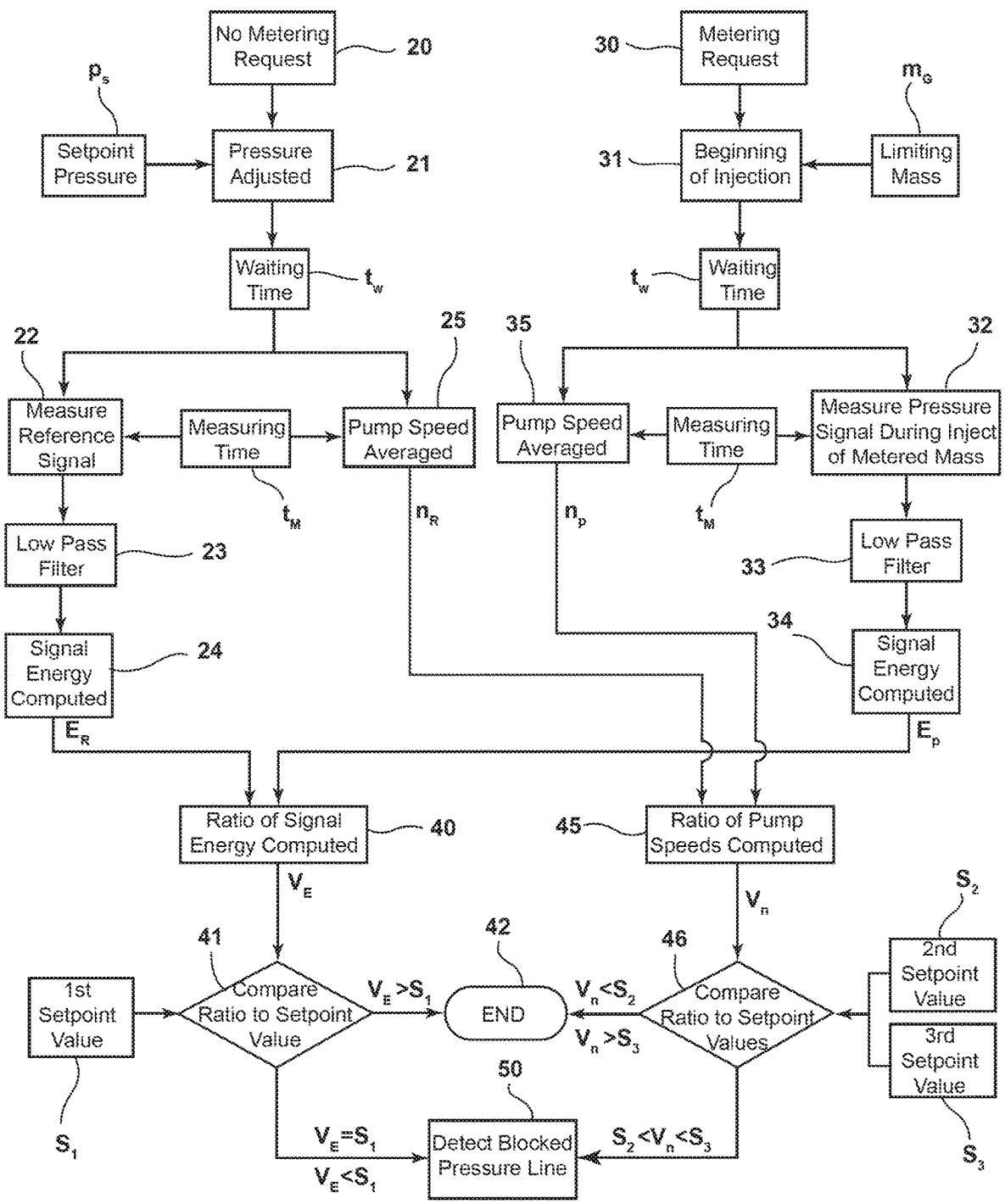
FIG. 2 shows a flowchart of an exemplary embodiment of the method according to the invention.

FIG. 2 shows a flowchart of an exemplary embodiment of the method according to the invention. At the beginning, there is no metering request 20 of the SCR system 10, so that no reducing agent solution is injected by the metering module 15 into the exhaust system. Thereafter, the pressure p is adjusted 21 to a setpoint pressure $p_s$, wherein the conveyor pump 13 maintains the setpoint pressure $p_s$. After a waiting time $t_W$, a measurement 22 of the reference signal, that is to say of a pressure signal when no injection of a reducing agent solution is performed by the metering module 15, is performed over a measuring time $t_M$. Subsequently, the reference signal passes through a low-pass filter 23, which suppresses long-term changes in the signal. Finally, a signal energy $E_R$ of the reference signal is computed 24 via the following formula 2. Since the measurement 22 of the reference signal was only performed over the measuring time $t_M$, the squared reference signal is only integrated over the measuring time $t_M$, so that the following formula 2 results from formula 1:

$$E_R = \int_{t_M} s^2(t)dt \qquad \text{(Formula 2)}$$

During the measurement 22 of the reference signal, an averaged measurement 25 of a pump speed $n_R$ of the conveyor pump 13 is additionally performed, also over the measuring time $t_M$.

In this exemplary embodiment, a metering request 30 is subsequently specified, in order to implement a measurement 32 of the pressure signal during an injection of a metered mass of the reducing agent solution into the exhaust system (not shown) by the metering module. In other exemplary embodiments, the measurement 32 of the pressure signal during an injection can also take place chronologically before the measurement 22 of the reference signal. Ideally, the measurement 32 of the pressure signal is carried out when a metering request is placed as a result of operating conditions of the internal combustion engine and/or due to processes running in parallel. If a beginning 31 of an injection (BIP—begin of injection period) of the metered mass is established, which injection exceeds a limiting mass $m_G$, a waiting time $t_W$ passes until the measurement 32 of the pressure signal, during which the conveyor pump 13 compensates for a pressure change as a result of the injection of the metered mass. The measurement 32 of the pressure signal during the injection takes place over the same measuring time $t_M$ as the measurement 22 of the reference signal. The pressure signal subsequently also passes through a low-pass filter 33. As for the reference signal, the signal energy $E_p$ is thereupon computed according to formula 2. An averaged measurement 35 of the pump speed $n_p$ is also additionally performed here over the same measuring time $t_M$.

If the signal energy $E_R$ of the reference signal and the signal energy $E_p$ of the pressure signal are available during the injection, a ratio $V_E$ is computed 40 from the two in the form of a quotient according to formula 3:

$$V_E = \frac{E_p}{E_R} \qquad \text{(Formula 3)}$$

In a first query 41, this ratio $V_E$ of the signal energies $E_R$ and $E_p$ is compared to a first setpoint value $S_1$, which is 1.2 in this exemplary embodiment. If the ratio $V_E$ is greater than the setpoint value $S_1$, therefore significantly greater than 1, the method is ended 42, since there is no clog 19 or other type of blocking of the pressure line 11.

Figure 3:
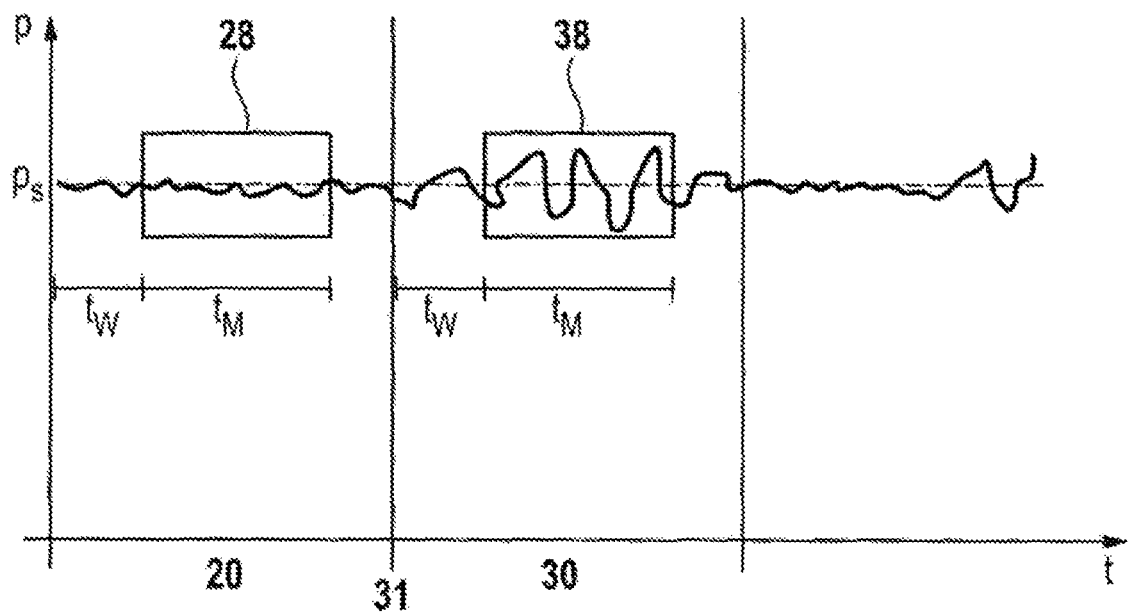
FIG. 3 shows a diagram of the pressure over time for an unblocked pressure line according to an exemplary embodiment of the method according to the invention.

This relationship is illustrated once again in FIG. 3. In this case, there is no clog 19 or other type of blocking of the pressure line 11. A diagram of the pressure signal recorded by the pressure sensor 17 is shown in FIG. 3 for the case in which there is no metering request 20, and for the case in which the metering request 30 exists. In the range 28, the pressure p over the measuring time $t_M$ is close to the setpoint pressure $p_s$. In contrast, with the metering request 30 existing, the pressure p in the range 38, after passage of the waiting time $t_W$ since the beginning 31 of the injection, shows a recognizably greater excitation, which is induced as a result of a change of the dynamic response due to an adaptation of the pump speed $n_p$. As a result, the signal energy $E_p$, while the metering request 30 exists, i.e., during injection of a metered mass of the reducing agent solution, is significantly greater than the signal energy $E_R$ when there is no metering request 20 and thus no injection. As a result, the ratio $V_E$ of the signal energies when the pressure line 11 is not blocked is significantly greater than 1.

In a further step 45 of the flowchart from FIG. 2, a ratio $V_n$ of the pump speeds $n_R$ and $n_p$ of the conveyor pump 13 is additionally computed. For this purpose, a quotient of the two pump speeds $n_R$ and $n_p$ is computed according to formula 4:

$$V_p = \frac{n_p}{n_R} \qquad \text{(Formula 4)}$$

In a second query 46, it is then checked whether the ratio $V_n$ of the pump speeds $n_R$ and $n_p$ is within an interval formed by a second setpoint value $S_2$ and a third setpoint value $S_3$. In this exemplary embodiment, the second setpoint value $S_2$ is 0.66 and the third setpoint value $S_3$ is 1.5. It is established by this query 46 whether the two pump speeds $n_R$ and $n_p$ are nearly identical. If this is not the case, the method is ended 42, since the ratio $V_E$ of the energy signals $E_R$ and $E_p$ no longer has significance.

The blocked pressure line 11 is detected 50 when the ratio $V_n$ of the pump speeds $n_R$ and $n_p$ in the case of the second query 46 is between the second setpoint value $S_2$ and the third setpoint value $S_3$ and in addition the first query shows that the ratio $V_E$ of the energy signals $E_R$ and $E_p$ is less than or equal to the first setpoint value $S_1$.

Figure 4:
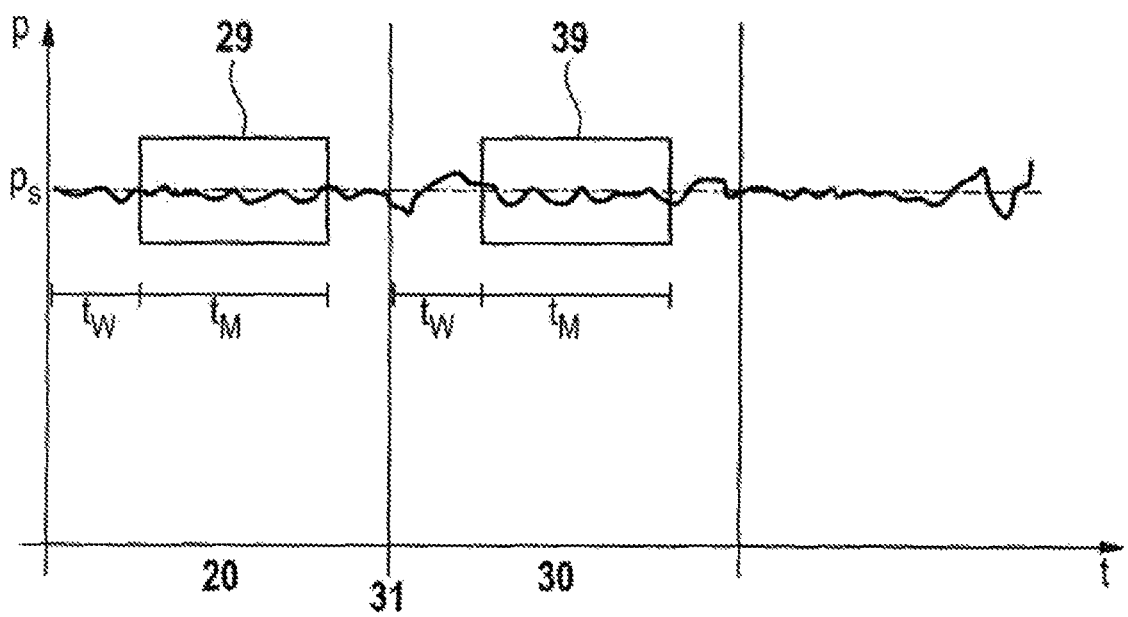
FIG. 4 shows a diagram of the pressure over time for a blocked pressure line according to an exemplary embodiment of the method according to the invention.

The case of the pressure line 11 blocked by the clog 19 is shown in FIG. 4. A diagram is also shown of the pressure signal recorded by the pressure sensor 17 for the case in which there is no metering request 20, and for the case in which the metering request 30 exists. Similarly to FIG. 3, the pressure p in the range 29 for the measuring time $t_M$ is close to the setpoint pressure $p_s$. In the measurement 22 of the reference signal, no differences are expected here between a blocked and an unblocked pressure line 11 if the other operating conditions are unchanged. In the range 39, meanwhile, differences are apparent from the range 38 from FIG. 3. The profile of the pressure p when the metering request 30 exists approximately corresponds to the profile of the pressure p when there is no metering request 20 even after passage of the waiting time $t_W$ since the beginning 31 of the injection. This relationship is proven, since the pressure p behaves in the same way with blocked pressure line 11 as with closed metering module 15. Therefore, a blocked pressure line 11 can be detected 50 if the signal energies $E_R$ and $E_p$ approximately correspond or the signal energy $E_R$ of the reference signal is even greater than the signal energy $E_p$ of the pressure signal during injection and accordingly the ratio $V_E$ is less than or equal to the first setpoint value $S_1$. In this exemplary embodiment, a clog 19 was used as a cause of the blocked pressure line 11. However, other factors, for example a blocked metering module 15, can also be responsible for this.

The invention claimed is:

1. A method for detecting a blocked pressure line (11) in an SCR system (10) of an internal combustion engine, which has a conveyor pump (13), a metering module (15), a pressure sensor (17), and an electronic control unit (18), the method comprising:
    measuring (22) with the pressure sensor (17) a reference signal of a pressure (p) in the pressure line (11) over a measuring time ($t_M$) when no injection of a reducing agent solution by the metering module (15) takes place and computing a signal energy ($E_R$) of the reference signal;

measuring (32) with the pressure sensor (17) a pressure signal over the measuring time ($t_M$) during an injection of a metered mass of the reducing agent solution by the metering module (15) and computing a signal energy ($E_p$) of the pressure signal with the electronic control unit (18);

computing (40) a ratio ($V_E$) of the signal energy ($E_p$) of the pressure signal to the signal energy ($E_R$) of the reference signal, with the electronic control unit (18); and detecting (50) the blocked pressure line (11) if the ratio ($V_E$) falls below a first predefined threshold value ($S_1$).

2. The method as claimed in claim 1, wherein the step of measuring (32) of the pressure signal is first carried out when a beginning (31) of the metered mass has exceeded a predefined limiting mass.

3. The method as claimed in claim 1, wherein during the step of measuring (22) of the reference signal, the conveyor pump (13) maintains (21) a setpoint pressure ($p_s$) in the pressure line (11).

4. The method as claimed in claim 3, wherein during the step of measuring (32) the pressure signal, the conveyor pump (13) compensates for a pressure change as a result of the injection of the metered mass.

5. The method as claimed in claim 1, further comprising:
detecting a pump speed ($n_R$; $n_p$) of the conveyor pump (13) in each case during the measuring (22) of the reference signal and during the measuring (32) of the pressure signal, and the detection (50) of the blocked pressure line (11) only takes place if a ratio ($V_n$) of the pump speeds ($n_R$; $n_p$) is between a predefined second threshold value ($S_2$) and a predefined third threshold value ($S_3$).

6. The method as claimed in claim 1, including providing a waiting time ($t_w$) between a beginning (31) of the injection and the measuring (32) of the pressure signal.

7. A non-transitory computer-readable storage medium, containing instructions that when executed by a computer of an electronic control unit (18) cause the computer to control an SCR system (10) of an internal combustion engine, which has a conveyor pump (13), a metering module (15), and a pressure sensor (17), to:

measure (22) a reference signal of a pressure (p) in the pressure line (11) with the pressure sensor (17) over a measuring time ($t_M$) when no injection of a reducing agent solution by the metering module (15) takes place and computing a signal energy ($E_R$) of the reference signal;

measure (32) a pressure signal with the pressure sensor (17) over the measuring time ($t_M$) during an injection of a metered mass of the reducing agent solution by the metering module (15) and computing a signal energy ($E_p$) of the pressure signal;

compute (40) a ratio ($V_E$) of the signal energy ($E_p$) of the pressure signal to the signal energy ($E_R$) of the reference signal; and detect (50) the blocked pressure line (11) if the ratio ($V_E$) falls below a first predefined threshold value ($S_1$).

8. An electronic control unit (18), which is configured to control an SCR system (10) of an internal combustion engine, which has a conveyor pump (13), a metering module (15), and a pressure sensor (17), the electronic control unit (18) including a computer with executable instructions to:

measure (22) a reference signal of a pressure (p) in the pressure line (11) with the pressure sensor (17) over a measuring time ($t_M$) when no injection of a reducing agent solution by the metering module (15) takes place and computing a signal energy ($E_R$) of the reference signal;

measure (32) a pressure signal with the pressure sensor (17) over the measuring time ($t_M$) during an injection of a metered mass of the reducing agent solution by the metering module (15) and computing a signal energy ($E_p$) of the pressure signal;

compute (40) a ratio ($V_E$) of the signal energy ($E_p$) of the pressure signal to the signal energy ($E_R$) of the reference signal; and detect (50) the blocked pressure line (11) if the ratio ($V_E$) falls below a first predefined threshold value ($S_1$).

* * * * *